July 12, 1932.　　　　　C. B. STEWART　　　　　1,866,605
AUTOMATIC FEEDER FOR CORN HUSKERS
Filed Nov. 1, 1930　　　3 Sheets-Sheet 1

INVENTOR
C.B.STEWART.
BY
ATTORNEY

July 12, 1932.  C. B. STEWART  1,866,605
AUTOMATIC FEEDER FOR CORN HUSKERS
Filed Nov. 1, 1930   3 Sheets-Sheet 2

INVENTOR
C.B. STEWART.
BY
ATTORNEYS.

July 12, 1932.  C. B. STEWART  1,866,605
AUTOMATIC FEEDER FOR CORN HUSKERS
Filed Nov. 1, 1930  3 Sheets-Sheet 3

INVENTOR
C. B. STEWART.
BY
ATTORNEYS.

Patented July 12, 1932

1,866,605

UNITED STATES PATENT OFFICE

CLARENCE BYRON STEWART, OF PORT DOVER, ONTARIO, CANADA

AUTOMATIC FEEDER FOR CORN HUSKERS

Application filed November 1, 1930. Serial No. 492,636.

My invention relates to improvements in automatic feeders for corn huskers, and the object of the invention is to devise means whereby all the ears of corn will be fed to the husker with the butt ends all turned in the same direction so that they will all be in a line with the severing knife of the husker, and it consists essentially of the arrangement and construction of parts as hereinafter more particularly explained.

Fig. 5 is a sectional plan view taken on the plane extending between the upper and lower members of the seizing mechanism.

Fig. 6 is a sectional detail taken through the adjacent ends of the main conveyer and husking conveyer on line 6—6 Fig. 2.

Fig. 7 is a sectional detail on line 7—7 Fig. 2.

In the drawings like characters of reference indicate corresponding parts in each figure.

Figure 1:
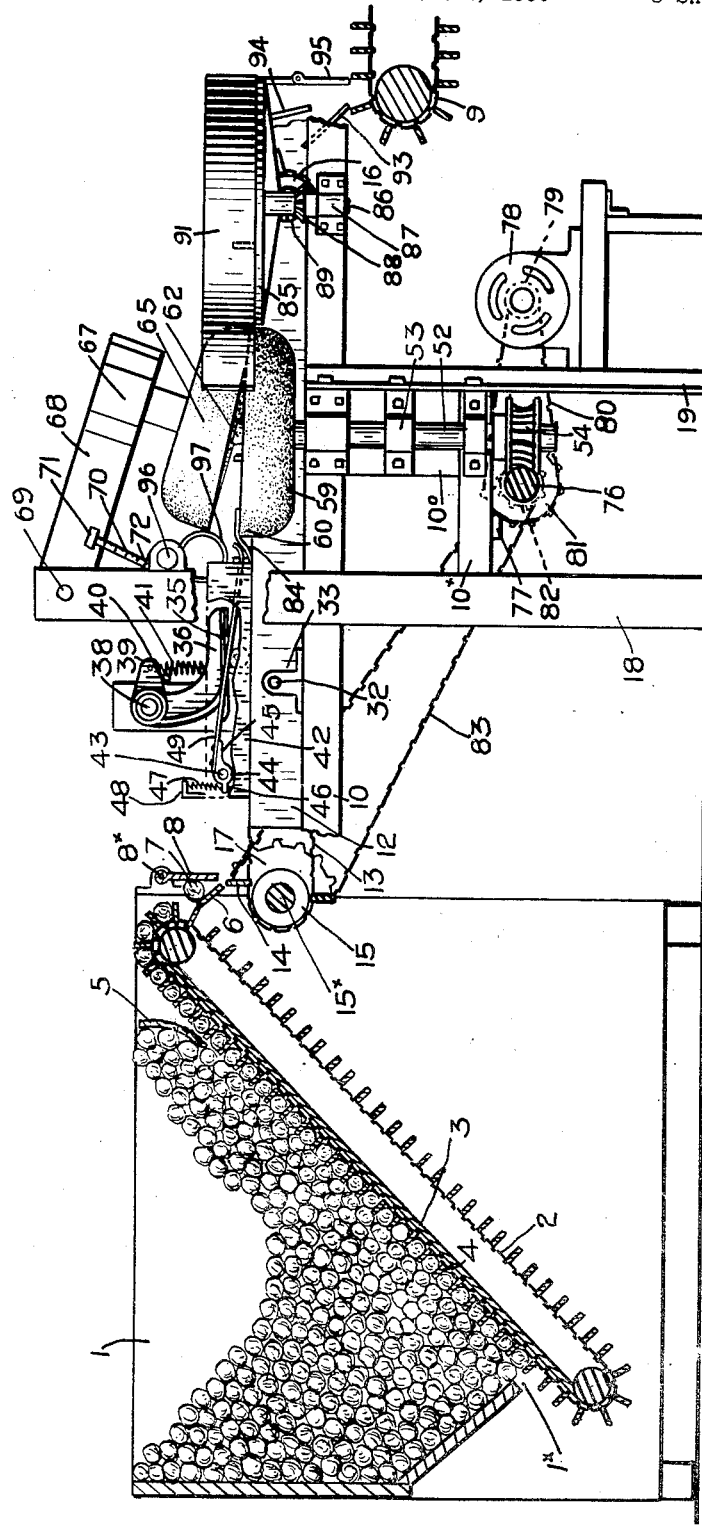
Fig. 1 is a side view of my device shown partially in plane elevation and partially in section.

I will first point out that in order to easily husk the ears of corn the butt end or large end of the ear is cut off by the severing knife of a husker adjacent to the stem thereby freeing the leaves at their point of attachment to the ear so that they may be freely stripped. In order to accomplish this it is necessary that all the ears of corn be turned so that the large end, at the point where it is desired the severance be made, be on a line with the severing knife of the husker. As the ears of corn are set in the main hopper with their butts and tips set indiscriminately it is necessary to turn those ears which have their tips set in a line with the severing knife end for end so that all the butts will be severed by the severing knife of the husker. In order to accomplish this result I have devised the following device.

1 is the main hopper the bottom of which is open as indicated at $1^x$, the bottom being formed by an upwardly inclined elevating conveyer 2 provided with an inclined table 3 for supporting the ears in the conveyer, the conveyer slats 4 being spaced apart sufficient distance so as to receive one ear of corn between each pair of slats. 5 is a curved apron located in the hopper adjacent the top of the conveyer so as to prevent any of the ears which are not directly engaged by the conveyer passing upward to the point of discharge. 6 is an inclined apron extending transversely of the hopper and on to which the ears of corn 7 are discharged individually from the conveyer 2. 8 is a gate which is pivoted at $8^x$ in front of the apron 6 so as to engage the ear of corn as it drops and control such drop so that it will fall directly transversely of the conveyer of my transferring mechanism hereinafter described.

9 is the conveyer of the husker (not shown) by which the ears of corn are carried to the husking knife above referred to. 10 and 11 are the side bars of the table 12 extending between the hopper 1 and husking conveyer 9. 13 is an endless conveyer the upper run of which extends over the upper face of the table 12 and is provided with transverse slats 14 which serve to carry the ears of corn, when dropped from the apron 6, from the receiving point to the discharging point on to the conveyer 9. The conveyer 13 is mounted upon rollers 15 and 16, the shaft $15^x$ of the roller 15 being provided with a sprocket gear 17. 18, 19, 20 and 21 are supporting standards from which the side bars 10 and 11 are carried.

22 is a rectangular opening formed in the table 12 between the chains of the main conveyer 13, such opening being set in the transverse oblique direction between such table. 23 and 24 are shafts mounted in suitable bearings 25 secured to the bottom of the table 12 at each side of the opening 22. 26 and 27 are sprocket gears secured to the shafts 23 and 24 on which is mounted a chain conveyer 28, the links of which are preferably provided with lateral flanges 29 and 30 provided with ear engaging spikes 31. $17^x$ is a sprocket gear mounted at the opposite end of the shaft 15ˣ to the gear 17.

32 is a shaft mounted in a bearing 33 at one end upon the side bar 10 and connected by a universal joint connection 34 to the shaft 24. By this means the transverse conveyer 28 is driven continuously from the main conveyer 13. 35 is a pressure plate carried by an arm 36 which is provided with an integral sleeve 37 mounted upon a shaft 38 and provided, at its opposite end, with an arm 39. The shaft 38 is carried in the standard 20 above referred to.

40 is a limiting pin secured to the standard 20 so as to project beneath the arm 39, such arm being drawn downwardly by a tension spring 41 connected at its lower end to the side bar 11. 42 is a plate which is secured to the table 12, such plate being set edgewise in a vertical position and extending parallel with the near edge of the conveyer 12 directly opposite the supplemental conveyer 28 and pressure plate 35. 43 is a stud shaft carried by the plate 42 at the end adjacent to the hopper 1. 44 is a sleeve swung upon the shaft 43 provided with oppositely set tongue projections 45 and 46. The projection 46 is connected by a tension spring 47 to a lug member 48 which preferably forms part of the plate 42. The projection 45 carries a finger 49 which extends parallel and close to the plate 42.

Figure 2:
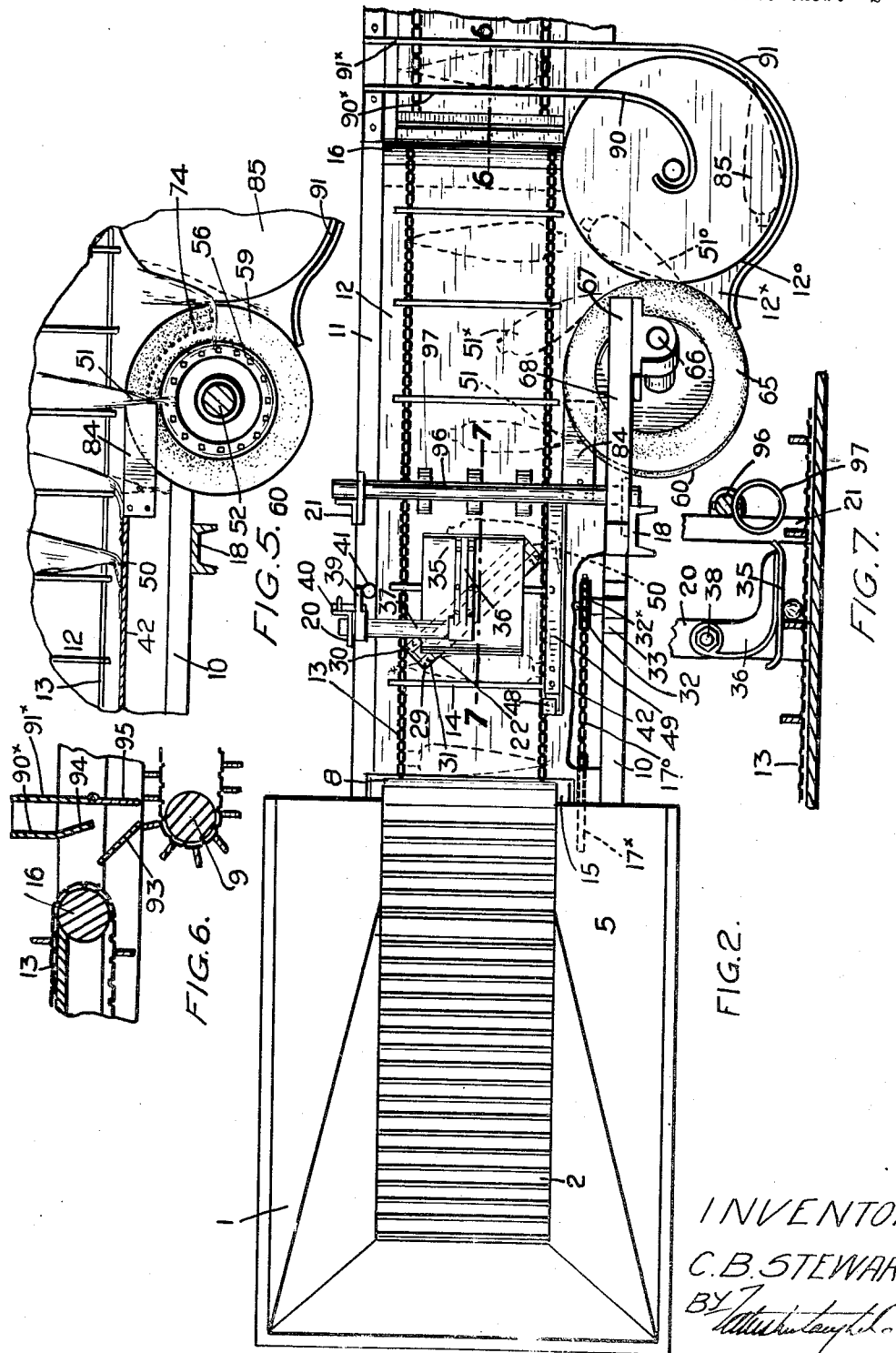
Fig. 2 is a plan view of my device.
Figure 3:
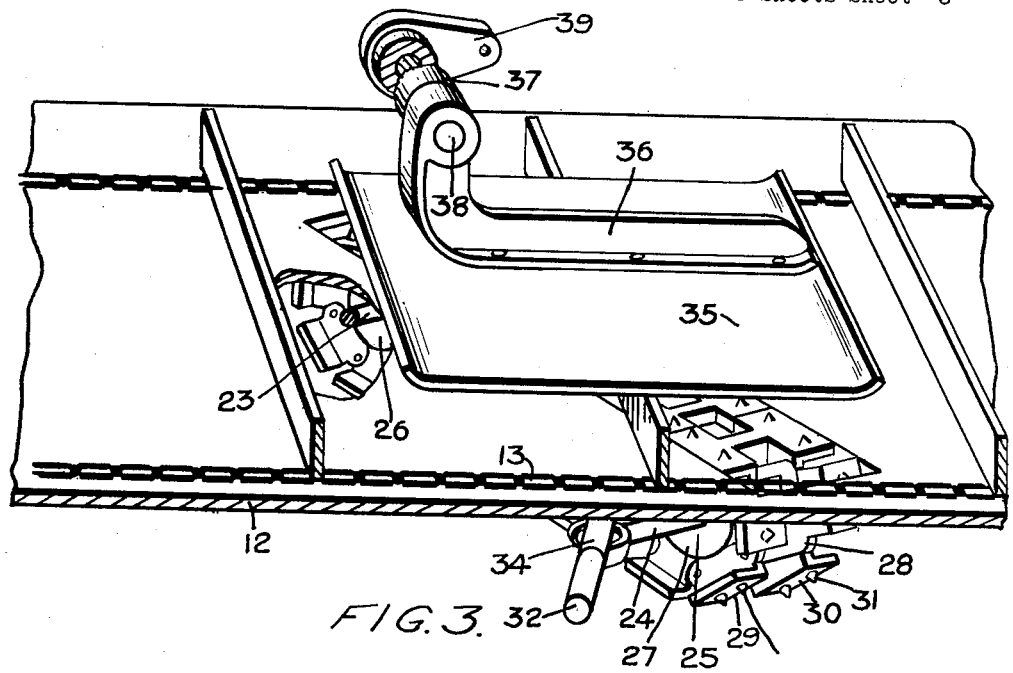
Fig. 3 is an enlarged perspective detail of the mechanism for forcing the ears of corn transversely of the main conveyer.
Figure 4:
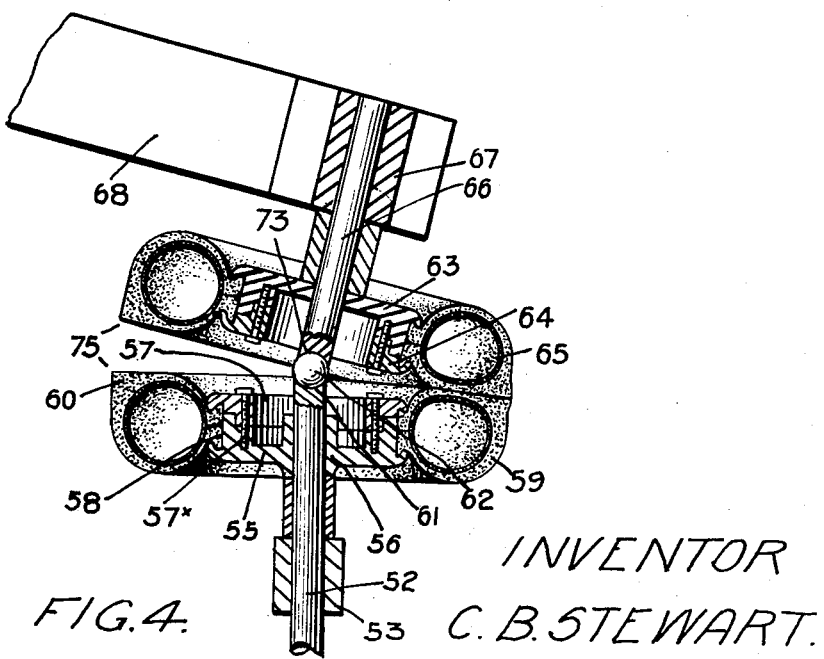
Fig. 4 is an enlarged sectional detail through the ear seizing mechanism.

As the ears of corn are carried upwardly from the elevating conveyer on to the main conveyer as previously described they are carried forward beneath the pressure plate 35 and on to the supplemental transverse conveyer 28. By this means, as the ears are carried forward by the main conveyer 13 they are simultaneously carried transversely of the main conveyer by the conveyer 28 so that their ends either butts or tips are forced against the face of the plate 42. If the butt ends of the ears are turned towards the plate 42 they are forced against such plate and thereby positioned to be engaged by the cutting knife of the husker when fed into the husker. If the tips of the ears of corn are directed towards the plate 22 they are forced against such plate and such tips being soft and springy are bent backwards into the position shown by dotted lines at 50 in Fig. 2 and in full lines in Fig. 5. When in this position the forward travel of the ear continues until the bent tip of the ear passes the plate 42 when it immediately springs outward by its own resilience so as to project past the plate into the position shown by dotted lines at 51 in Fig. 2 and full lines in Fig. 5.

I will now describe the means by which these tips are seized and the ears of the corn withdrawn from the main conveyer.

52 is a shaft which is mounted in bearings 53 carried by the side bar 10 and the frame members 10ˣ and 10°. 54 is a worm gear secured to the lower end of the shaft 52. 55 is a disc provided with a central hub 56 which is secured to the upper end of the shaft 52. 57 is an annular member which is secured to the upper face of the disc 55 by screws 57ˣ. The peripheral portions of the disc 55 and member 56 together form a tire receiving groove or rim as indicated at 58. 59 is a pneumatic tire, the peripheral portion of the outer casing of which is built up as indicated at 60 to form an annular flat seating surface for a purpose which will hereinafter appear.

The tire 59 is secured in the rim 58 in any manner similar to that commonly employed for attaching pneumatic tires. The upper end of the shaft 52 is provided with a ball receiving cup 61 in which a ball 62 fits. 63, 64 and 65 are respectively, disc, locking member and tire similar to the disc 55, locking member 56 and tire 59 previously described. The tire 65 and its carrying parts are mounted upon a shaft 66 journalled in a bearing 67 mounted upon an arm 68 which is pivotally carried at 69 upon the upwardly extended end of the standard 18. The angular position of the arm 68 may be adjusted by means of an adjusting screw 70 extending between a lug 71 turnably carried by the arm 68 and a lug 72 carried by the standard 18. The lower end of the shaft 66 is also cupped as indicated at 73 so as to receive and bear upon the upper peripheral portion of the ball 62.

By this means the tires 59 and 65 are held in an angular position one to the other, the area of the contacting portions being indicated by dotted lines 74 in Fig. 5 thereby forming an angular receiving mouth 75 into which the sprung out end illustrated at 51 Fig. 5 is carried by the forward travel of the main conveyer 13. The tire members 59 and 65 are rotated in unison, the shaft 52 thereof being driven from the worm gear 54 which is in meshing engagement with the transverse worm shaft 76 mounted in suitable bearings as indicated at 77. 78 is the main driving motor provided with a driven sprocket gear 79 connected by a sprocket chain 80 to a sprocket gear 81 secured to the shaft 76. The shaft 76 is also provided with a sprocket gear 82 connected by a chain 83 to the sprocket gear 17 of the main conveyer.

By this means the tires 59 and 65 and the main conveyer 13 is driven from the motor 78, the conveyer 28 being driven from the main conveyer through the gear 17ˣ, chain 17° and gear 32ˣ. As the released tips of the ears are carried forward into the mouth 75 they are elevated by the inclined plate 84 on to the upper face of the tire 59. As the ears are carried forward the tips are carried between the converging sides of the mouth 75 to the point of contact between the tires 59 and 65 and are thereby seized therebetween so as the tire members 59 and 65 continue to revolve the ear is drawn from the position shown in 51 through the position shown in 51˟ to the position shown in 51° which is the point of release, or in other words where the opposing faces of the tire start to diverge apart due to the angular position of the tire members.

When the ear of corn is drawn to the position 51° it is supported upon a revolving disc 85 which is mounted upon a shaft 86 carried in bearings 87 secured to the side bar 10 of the main conveyer. The shaft 86 is provided with a bevelled gear 88 in mesh with a bevel gear 89 secured to the shaft of the main conveyer roller 16. By this means the disc 85 is driven in unison with the main conveyer.

90 and 91 are guide walls, the wall 91 extending around the outer periphery of the disc 85 preferably forming part of an extension 12˟ of the main table 12, an orifice 12° being formed therein in which the disc 85 revolves. The wall 90 is carried by the side bars 10 and 11, the walls 90 and 91 being provided with parallel portions 90˟ and 91˟ which are spaced apart a distance substantially equal to the width of the ear of corn, the inner ends of the walls 90 and 91 being flared outward in a curved diverging direction so as to form a receiving mouth for the ears and guide them into a space between the parallel portions 90 and 91. As they are carried into this space the speed of travel is sufficient to take them into a central position over the main conveyer a cross wall 92 being provided, if necessary, to limit such travel and ensure the gear dropping centrally on to the conveyer 9 of the husking machine.

It will be readily seen from the above description that when the ears of corn are fed on to the disc 85 and carried around the disc to the point of discharge they are turned end to end relatively to the original position upon the main conveyer so that the butt ends of the ears will be directed towards the near side of the conveyer and in a line with the severing knife of the husker which is in a line with the near side of the husking conveyer.

When the ears of corn are discharged from the main conveyer those ears which have their butts normally turned in a line with the husking knife drop on to the apron 93 so as to fall in between the slats of the husker conveyer to turn ears fed between the parallel walls 90˟ and 91˟ drop on to the apron 94 so as also to be fed between the slats of the husker conveyer, the fall of both of these ears being controlled by the hinged gate 95 so that they are fed accurately into position between the slats of the husker conveyer.

In order to hold the ears in their transverse position as the tips are carried up the inclined plate 84, I provide a transverse shaft 96 on which are secured spring rings or bands 97 which bear upon the bodies of the ears as they pass forward.

Having described the principal parts involved in my invention I will briefly describe the operation of the same.

Ears of corn are manually placed in the hopper 1 so as to bear upon the elevated conveyer 2 and individually fill the pockets formed between the slats thereof. As the elevating conveyer is driven from any suitable source the ears are discharged one by one on to the apron 6 so that they fall in transverse position on to the end of the main conveyer 13. The ears are then carried forward between the pressure plate 35 and transverse conveyer 28 which serve to force the ears transversely of the conveyer and the ends thereof against the plate 42.

If the soft tips of the ears are directed towards this plate they are bent in a rearward direction so that when such tips are carried past the end of the plate 42 by their forward travel, such tips spring outward when freed and into a direct path to pass between the converging sides of the mouth 75 formed by the tire members 59 and 65 to seize between the contacting faces of these members so that as they revolve the ear is withdrawn and fed on to the revolving plate 85 which serves to turn the ears end for end as they are carried between the receiving point and the discharge point on to the husker conveyer feeding the ears to the severing knife of the husker.

From this description it will be seen that I have devised a very simple device whereby ears of corn set indiscriminately in a hopper may be fed forward to the husking knife of the husker so that the butt end of all the ears fed are in direct alignment with such knife for severance.

What I claim as my invention is:

1. In a feeding device for corn huskers, a conveyer on which the ears of corn are received in a transverse position with the butts and tips set indiscriminately in either direction, tip seizing means at one side of the conveyer, means for forcing the ears of corn longitudinally of themselves as they pass towards the seizing means, means for bending the resilient tips as the ears are forced longitudinally and for releasing the bent tips to spring outward to their normal position as they pass to the seizing means, and means for operating the seizing means to withdraw the ears.

2. In a feeding device for corn huskers, a conveyer on which the ears of corn are received in a transverse position with butts and tips set end to end in either direction, tip seizing means at one side of the conveyer, a vertically set plate adjacent and parallel to the edge of the conveyer and located between the receiving and seizing points of the ears, and means for forcing the ears longitudinally against the plate to bend those tips which are adjacent thereto permitting the said tips to spring outward when carried past the plate into the path of the seizing means.

3. In a feeding device for corn huskers, a conveyer, a horizontally revolving disc adjacent the conveyer, and means for withdrawing ears having the tips adjacent the disc from the conveyer on to the disc to be discharged into the line of feed from a diametrically opposite point on the discs with the tips pointed in an opposite direction.

4. In a feeding device for corn huskers, a main conveyer, a supplemental conveyer set in an angular position beneath the top run of the main conveyer to engage the ears as they are fed forward to force them laterally of the main conveyer, means coacting with the supplemental conveyer for bending the ear tips during such lateral movement, and means for seizing the tips when released from their bending pressure adapted to withdraw the ear having the seized tip from the main conveyer.

5. In a feeding device for corn huskers, a main conveyer, a supplemental conveyer set in an angular position to the main conveyer beneath the top run of such conveyer and adapted to engage the ears to force them laterally of the main conveyer, a pressure member mounted over the supplemental conveyer to force the ears into contact therewith, means coacting with the lateral movement of the ears for bending the tips presented thereto, and means for seizing the tips as they spring back to their normal position, and means for actuating the seizing means to withdraw the ears from the main conveyer.

6. In a feeding device for corn huskers, a conveyer on which the ears of corn are received in a transverse position, tip seizing means comprising two annular rotating members the opposing faces of which are set at an angle one to the other with face portions adjacent their periphery in rolling contact, means for carrying the adjacent corn tips between the contacting face portions of such members, and means for rotating the members to successively seize the ears to withdraw such ears from the conveyer and to release the ears when withdrawn.

7. In a feeding device for corn huskers, a conveyer on which the ears of corn are received in a transverse position, tip seizing means comprising a horizontally set annular member provided with a pneumatic tire forming its periphery, and a similar member also provided with a pneumatic tire periphery set at an angle to the aforesaid so that they remain in frictional contact adjacent their periphery, and means for rotating such contacting members to seize the tip of each ear of corn as it is fed thereto by a conveyer to withdraw it from the conveyer during its forward travel.

8. In a feeding device for corn huskers, a conveyer on which the ears of corn are received and carried forward in a transverse position with the tips and butts set indiscriminately in either direction, tip seizing means at one side of the conveyer, means for conveying the ears forward so that the tips project laterally of the path of the ends of the butts, means for bending such tips into alignment with such path as they approach the seizing means, and means for releasing such bent tips to enter the seizing means permitting the butt ends to pass clear of such seizing means during the forward travel of the ears.

CLARENCE BYRON STEWART.